INVENTORS:
Walter W. Heinze
Evan A. Jones
Don B. Carson

United States Patent Office 3,476,283
Patented Nov. 4, 1969

3,476,283
INTERNALLY INSULATED AND LINED
PRESSURE VESSEL
Walter W. Heinze, Chicago, and Evan A. Jones and Don
B. Carson, Mount Prospect, Ill., assignors to Universal
Oil Products Company, Des Plaines, Ill., a corporation
of Delaware
Filed July 5, 1968, Ser. No. 742,710
Int. Cl. B65d 25/00, 25/14; B01d 3/00
U.S. Cl. 220—15                                    3 Claims

ABSTRACT OF THE DISCLOSURE

A liner construction for an internally insulated and metal lined pressure vessel which suspends a major section of the metal liner from the upper portion of the vessel permitting a lower free end to expand downwardly, and provides a separate lower liner section to be in the lower portion of the vessel and sized to slidably overlap the lower portion of the suspended liner section, and, in addition, provides a plurality of spaced apart finger-like support members projecting inwardly from the lower wall portion of the vessel to engage and support said separate lower liner section.

---

The present invention relates to an improved liner construction in a pressure vessel and more particularly to an improved system for supporting the metal liner in a high temperature, internally insulated chamber so as to prevent displacement or breakage of rigid insulation being used therein and, at the same time, preclude any trapping of condensate behind a lower portion of the metal liner.

It is, of course, not novel to have internally insulated reactors or pressure vessels, nor is it new to have spaced internal linings; however, there have been problems in providing a liner system which does not tend to impinge upon and break the insulation layer. In other cases there have been problems with liners in high temperature packed chambers, and it has been necessary to provide improved liner systems adapted for use with reactors having internal packing and/or catalytic materials so as to allow free movement of the liner longitudinally and radially due to temperature changes. Also, certain of the present systems have had problems in eliminating "hot spots" on the outer chamber wall. In still other instances, the liner systems have been quite elaborate and involved and therefore expensive to install and/or maintain.

It is thus a principal object of the present invention to provide a simplified and easily installed liner system for a pressure chamber.

It may also be considered an object of the present invention to use a liner system with a minimum number of parts or sections and a support arrangement which minimizes the number of fixed joints or connections.

Still further, the improved liner system precludes the trapping of any reactant liquid or condensate behind the lower portion of the metal liner as well as provide for free expansion and contraction movements in the presence of internal packing.

In a broad aspect, the present invention may be considered to embody an improved internally insulated and lined pressure chamber, where an insulating material is maintained against the interior surface of the wall of the chamber and behind an inner metal liner, with the improved construction comprising in combination, an elongated tubular-form liner section connected to and depending from the upper end of the chamber whereby to permit movement of the lower free end in a downward unidirectional manner, providing a separate lower liner section in the lower portion of said chamber, with such lower liner section sized to slidably overlap the lower end of said depending liner section, and a plurality of spaced apart support members projecting through the insulating material from the lower wall portion of said pressure chamber to engage and support said separate lower liner section at spaced points without the latter being peripherally joined to said chamber.

The lower internal liner section, which is of a ring-like nature may be supported in various ways, such as by prong-like legs that are spaced apart and connect to the lower wall portion of the chamber so as to provide a discontinuous connection between the lower liner section and the chamber wall. In other words, it is desired that any liquids, from condensation or from a reactant stream, be permitted to readily drain from behind the lower portion of the liner and not become trapped within the insulated material behind the liner. Although various types of legs, projections, prongs, etc., may be utilized to extend from the lower edge portion of the lower liner section; a preferred arrangement will utilize a plurality of spaced apart finger-like support members to extend inwardly from the inner surface of the lower portion of the chamber wall so as to be able to support the lower liner section without any fixed connection. There is thus eliminated any continuous welding, bolting, or other fixed connections between the lower edge of the ring-like liner section and the chamber itself. The prongs or finger-like support members can extend radially inwardly from the wall of the chamber at spaced points and permit the mere resting of the lower edge of the ring-like liner section thereabove. Alternatively, suitable slots may be spaced around the lower periphery of the lower liner section to in turn accommodate the insertion of the spaced apart vessel-like support members.

Generally, the lower liner section will be sized to fit internally within the lower end portion of the upper suspended liner section so that as a result the smaller lower liner section will be maintained in proper alignment by the lower end portion of the upper section and no fixed connections will be required between the finger-like support members and the lower portion of the lower liner section. This construction simplifies the installation of the liner by minimizing bolting, welding or other fixed types of attachment, with the only fixed connection being the welding, or other fixed connection, provided between the upper edge portion of the upper liner section and the upper head portion of the chamber.

The use of internal insulation and a liner for a pressure vessel or reactor which must operate with high internal temperatures of the order of 900° F. or more, will of course, reduce the cost of the chamber. Where there is utilized a "hot wall" chamber with no internal insulation, then the vessel wall may well be of the order of 4" to 6" in thickness and, in addition, may require an alloy deposit or cladding to withstand acidic materials or corrosive reactions which may be encountered in a particular processing condition. For example, in the petroleum processing arts where there is the catalytic conversion of a mixed phase hydrocarbon stream (i.e. both vapor and liquid phases) at a temperature of the order of 900° F. and a pressure of the order of 2000 pounds per square inch, then a "hot wall" reactor chamber may be alloy steel of the order of 6" in thickness or more, depending upon diameter of each chamber. On the other hand, where there is an internal insulation material, generally rigidly attached to the inner wall surface of the chamber, so that there is, in effect, a "cold wall" type of chamber, then the wall may be made of the less expensive cold-rolled types of steels and be thinner for the same type of hydrocarbon conversion.

It is not intended to limit the present improved construction and arrangement to the use of any one type of internal insulation; however, the insulation should be carefully applied to the inner surface of the wall of the chamber so as to be substantially continuous and preclude the possibility of any hot vapors or liquid contacting the outer wall of the chamber. For example, the insulating material may be of the light weight concrete type, such as provided by the calcium-aluminate cements with temperature resistant aggregates such as crushed firebrick, vermiculite, "perlite" and the like, which in turn may be applied as a cementatious slurry through pressure nozzle means, in the manner of "Guniting," or by troweling. In other words, the insulating material may be sprayed, troweled, or otherwise allied over reinforcing rods, anchor clips, etc., in the same manner that a poured cement may be deposited over reinforcing materials. In still other instances, the internal insulation may be of tile or of a precast or preformed type of lightweight "block" insulation that is cut and fit to entirely cover the internal wall of a particular chamber. Generally, with block insulation there will be suitable studs, pins, or other types of fasteners that are spaced apart and connected to the inside wall of the chamber but capable of projecting through, or into, the block insulation and clamping it tightly to the interior wall at the particular chamber.

The metal liner materials for use on the inside of the pressure chamber will generally be of alloy materials capable of withstanding the high temperature and/or corrosion conditions encountered in the particular processing operation. In addition, the liner will be of sufficient strength to withstand the differential pressure which will exist in a packed chamber by reason of "pressure drop" through the packed bed as well as the hydrostatic pressure of the particular packing in the chamber. In any case, the liner should be of suitable thickness to adequately protect the inner wall surface of the intermediate insulating material. As a further consideration and inasmuch as the liner sections will have substantial movement to accommodate differential expansions taking place between start-up conditions and operating conditions for the particular process chamber, then such liners shall, of course, be designed to withstand the problems of differential expansion, including the strength to overcome radial stresses from supporting members that in turn may be moving by reason of temperatrue differential.

Reference to the accompanying drawing and the following description thereof will serve to illustrate one embodiment of the present improved internally insulated and internally lined pressure vessel, as well as point out the construction and operational advantages which are obtainable in connection with the present improved and simplified arrangement.

Figure 1:
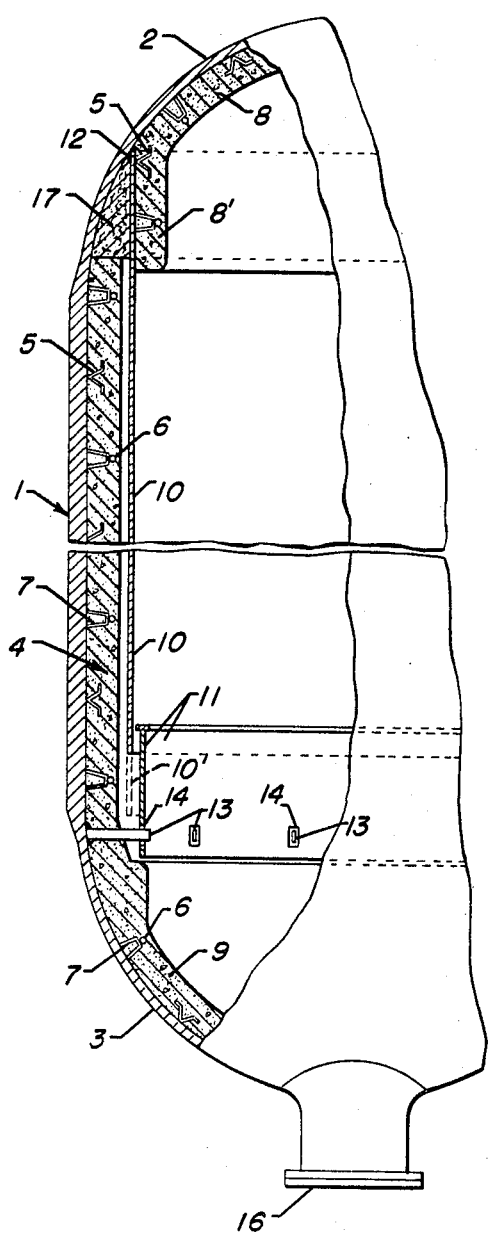
FIGURE 1 of the drawing is a partial, sectional elevational view of a pressure chamber utilizing the present improved form of lining sections and support arrangement.

Referring now particularly to FIGURE 1 of the drawing, there is shown an outer wall 1 for a pressure chamber in turn having an upper head or end section 2 and a lower end section 3. The interior of the chamber wall 1 is provided with an insulating concrete type of insulation material 4 which is rigidly held to the wall by suitable reinforcing members such as spaced anchor clips 5 and spaced apart rods 6 which in turn are held on spacers or rod support chairs such as 7. The upper head section 2 is similarly provided with an insulating type of concrete 8 utilizing similar forms of reinforcing and attachment members as described for wall 4, while the lower head section 3 again similarly uses internal insulating concrete 9 to provide a suitable liner preventing the transmission of high temperature conditions to the outer portion of the chamber.

Spaced around the interior portion of the pressure chamber and over the inner surface portions of the insulating material 4 is a metal liner comprising an upper section 10 and a lower section 11. In accordance with the present invention, the upper liner section 10 comprises a major portion of the entire internal lining and is welded or otherwise fixedly connected at 12 to the inside surface of the wall of the upper head section 2. Thus, the lower free end of the liner 10 can move downwardly in a unidirectional manner when high temperature conditions are appplied to the liner after a process start-up. The expansion of the lower end of the liner 10 is indicated by the dashed lines 10' carrying on downwardly around the lower and smaller ring-like liner section 11. The latter liner section is thus sized to be a slidable fit within the interior portion of the free end of liner section 10.

Figure 3:
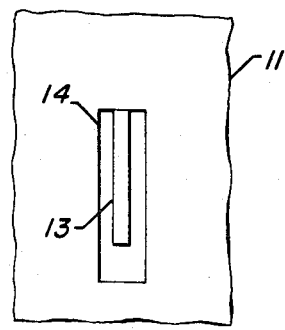
FIGURES 3 and 4 are enlarged partial elevational views showing the use of slots within the lower portion of the lower liner section to accommodate the spaced apart support members extending radially inward from the inner wall of the chamber.
Figure 4:
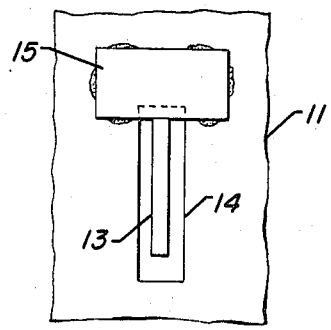

Also, as indicated in the drawing, the lower liner section 11 is shown supported from a plurality of "finger-like," or prong-like, support members 13 which are spaced around the inside periphery of the pressure chamber wall in a radial manner. Each of the finger-like support members 13 may be welded or otherwise fixedly attached to the inside surface of the chamber wall whereby they in turn provide adequate supporting means for the lower liner section 11. Care should be taken in attaching the support members 13 to the wall so as to provide that they are all in a uniform horizontal plane and, in turn, hold the liner section 11 in a uniform plane capable of fitting within the lower end of section 10 in a manner to preclude binding. The plurality of spaced apart support members 13 may be at an elevation to be directly under the lower edge of the ring-like liner section 11 and merely let such section rest thereon in an unattached manner; however, in the embodiment illustrated, and as best shown in FIGURE 3, a plurality of slots 14 are provided within the lower portion of the liner section 11 to in turn accommodate the ends of the support members 13. Thus, the top edges of support members 13 will contact and support the ring member 11 from the top edges of the slots 14. In an alternative arrangement as shown in FIGURE 4, and as a means for providing accurate leveling for the entire section 11, there are provided leveling plates 15 to weld or otherwise attach to the inner surface of the liner 11 so as to modify, in each instance, the upper extremity of the slot section 14 and provide a supporting edge at a precise elevation for the top edge portion of a matching support member 13.

The described method of supporting the lower liner section 11 from legs or prong-like support members, such as 13, will preclude the necessity of having a continuous peripheral connection of the lower edge of the liner section to the inside wall of the chamber. The elimination of the continuous joining of the lower lining section to the chamber is of particular advantage in providing a construction which will permit any liquid or condensed vapor, that may be behind the internal metal liner, to drain down into the lower central portion of the pressure chamber and to an outlet nozzle means 16. A still further advantage of having the lower liner section supported from spaced prong-like members is the elimination of having a portion of the lower liner section carried downwardly into or through the rigid insulating material 9 which is attached to the lower inside wall of the chamber. Besides the problem of collecting liquid behind the lower liner section, if the metal liner were attached to the relatively cold inside of the chamber wall, which undergoes very little differential expansion as pared with the inside portion of the liner section, then there would result a high degree of differential expansion. Such expansion would take place linearly and peripherally throughout the height of the liner section that was within the insulating material whereby there would be a considerable pressure against the insulation and a resulting breakage thereof away from the inside wall of the pressure chamber. Chipping and breaking of insulation would, of course, lead to dangerous hot spots on the chamber wall.

At the upper end portion of the pressure chamber where the liner 10 attaches to the upper head section 2, the internal lining 8 is shown to continue downwardly as a portion 8' over the upper inside wall surface of liner 10 and provide for minimal expansion of such upper portion. Also, rigid internal insulation is eliminated and replaced with a compressible form of insulation, such as mineral wool 17, at the zone behind the extreme upper end portion of liner section 10 so as to preclude differential expansion being exerted against a block or other rigid concrete type of lining.

Figure 2:
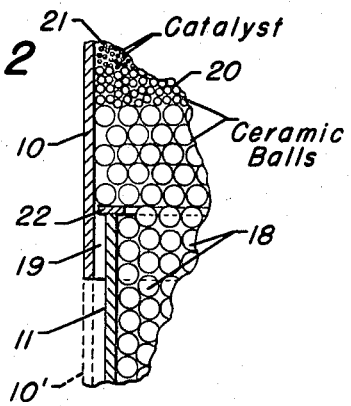
FIGURE 2 of the drawing merely illustrates, in a somewhat enlarged sectional view, the portion of the internal metal lining where the upper and lower sections meet and overlap.

In FIGURE 2 of the drawing, there is indicated the utilization of a packed bed of high temperature resistant ceramic balls within the lower portion of the pressure chamber and against the lower liner section 11 as well as thereabove and against the lower portion of the upper liner section 10. The ceramic balls 18 in the lower portion of the chamber are preferably of a relatively large size, of the order of ¾" to 1" diameter, so as to preclude their passage into the zone 19 where there is an overlap between liner sections 10 and 11. However, smaller ceramic balls 20 may be used on top of the larger ball 18 to provide a transition zone which in turn supports still small diameter catalyst beads or particles 21 which will, in turn, occupy the major internal portion of the chamber. As a means for effecting a better uniform alignment between liner sections 10 and 11, as well as means to preclude ceramic balls or catalyst binding against the end of liner 10 or carrying down into the overlap zone 19 between sections 10 and 11, there may be a narrow ring member 22 welded or otherwise attached to the top edge of liner section 11 so that it fits thereon in the manner of a small flange member.

It should be noted that the present simplified form of liner system is particularly adapted to provide an internal metal liner within the interior of an insulated pressure vessel and, further, that the system might well be used in the reverse manner such that the major portion of the liner extends upwardly from the lower bottom head of the vessel and the smaller overlapping ring-like section supported from the upper head or end portion of the vessel. Such an arrangement might be of advantage in a vessel having no problems with liquid streams or condensate which might collect within the lower portion of the vessel to become trapped behind the liner. However, where there is a mixed phase of materials in the vessel or any liquid condensate possible within the insulation material and behind the liner, then it is preferable and necessary that the liner construction be placed substantially as shown in the present drawing whereby liquid is free to run out from behind the support means and the lower portion of the liner section. In other words, the liner, in effect, shall be discontinuous with respect to its connection to the bottom portion of the vessel wall. As pointed out hereinbefore, it is, of course, not intended to limit the present improved system to the use of support members exactly like 13, inasmuch as modifications in design or shape, angle or projection, method of attachment and the like, is quite possible without departing from the scope of the present invention in effecting a non-fixed and non-continuous supporting arrangement for the lower edge portion of the lower liner section 11.

We claim as our invention:

1. In an internally insulated and lined pressure chamber, where an insulating material is maintained against the interior face of the wall of the chamber and behind an inner metal liner, the improved construction which comprises a tubular-form liner section connected to and depending from the upper end of the chamber wall whereby to permit movement of the lower free end thereof in a downward manner, providing a separate lower liner section in the lower portion of said chamber, with such lower liner section sized to slidably lap-fit within the lower end of said depending liner section, and a plurality of circumferentially spaced apart support members projecting through the insulating material from the lower portion of said pressure chamber wall to engage and support said separate lower liner section at circumferentially spaced points without the latter being peripherally joined to said chamber.

2. The insulated and lined pressure chamber of claim 1 further characterized in that said plurality of spaced apart support members are small finger-like members, each of which projects radially inward from the inside surface of said chamber wall.

3. The insulated and lined pressure chamber of claim 1 further characterized in that the lower liner section has a plurality of circumferentially spaced slots that are sized and positioned to receive the inwardly projecting end portions of said support members.

References Cited

UNITED STATES PATENTS

| 1,850,933 | 3/1932 | Huff. | |
| 1,924,832 | 8/1933 | Brandt | 220—63 X |
| 2,548,519 | 4/1951 | Cummings | 23—288 |
| 2,683,654 | 7/1954 | Bergman | 196—133 X |
| 2,833,631 | 5/1958 | Rossheim et al. | 23—288 |
| 3,268,103 | 8/1966 | Nelson | 220—3 |

FOREIGN PATENTS

| 448,038 | 5/1949 | Italy. |

JOSEPH R. LECLAIR, Primary Examiner

J. R. GARRETT, Assistant Examiner

U.S. Cl. X.R.

23—289; 196—133; 220—63